No. 713,467. Patented Nov. 11, 1902.
D. MACDONALD.
DRIVING GEAR FOR MOTOR CYCLES.
(Application filed June 28, 1902.)
(No Model.) 3 Sheets—Sheet 2.
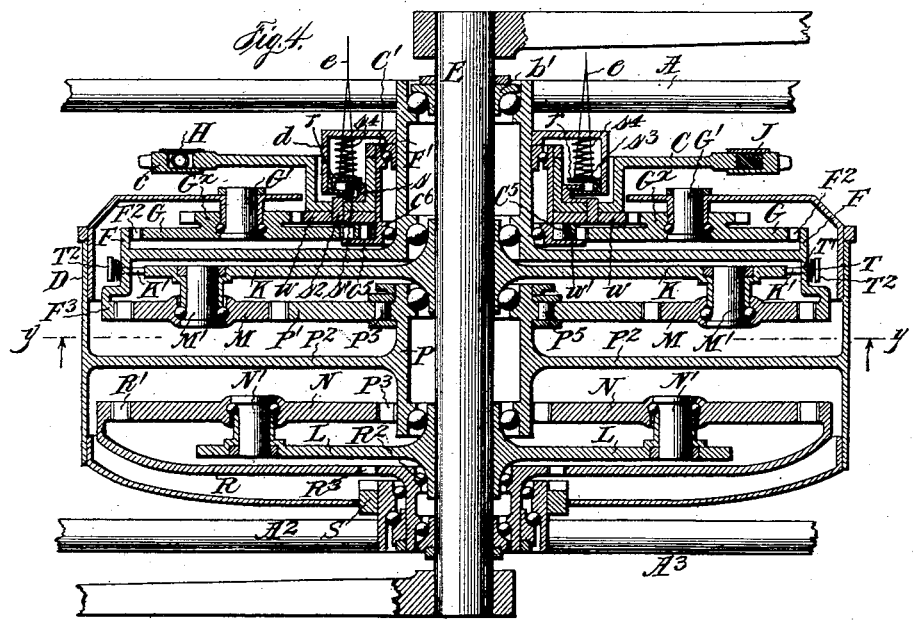
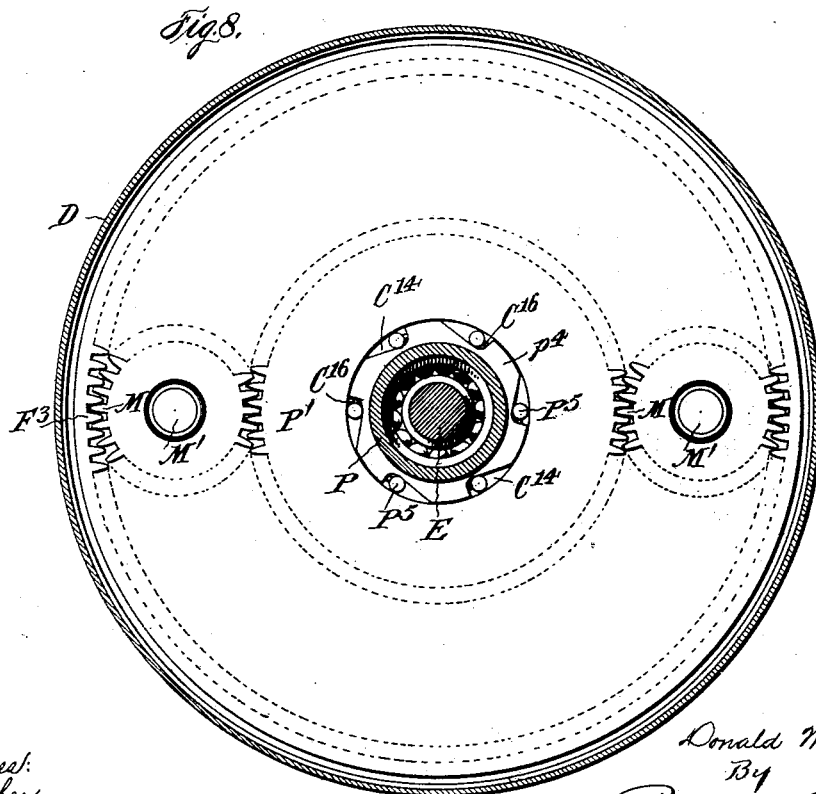
Witnesses:
Inventor,
Donald Macdonald,
By
Atty.

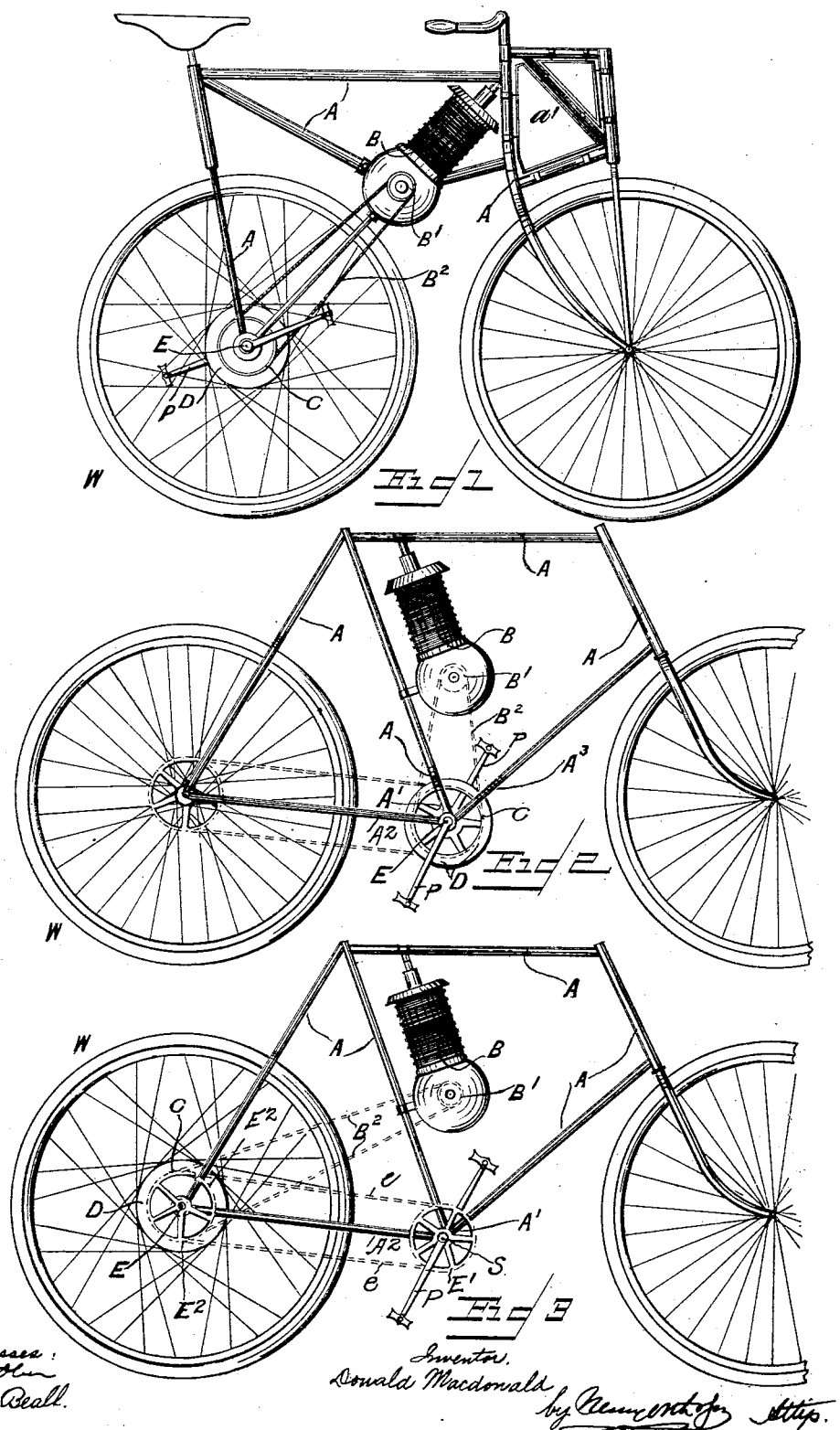

No. 713,467. Patented Nov. 11, 1902.
D. MACDONALD.
DRIVING GEAR FOR MOTOR CYCLES.
(Application filed June 28, 1902.)
(No Model.) 3 Sheets—Sheet 3.
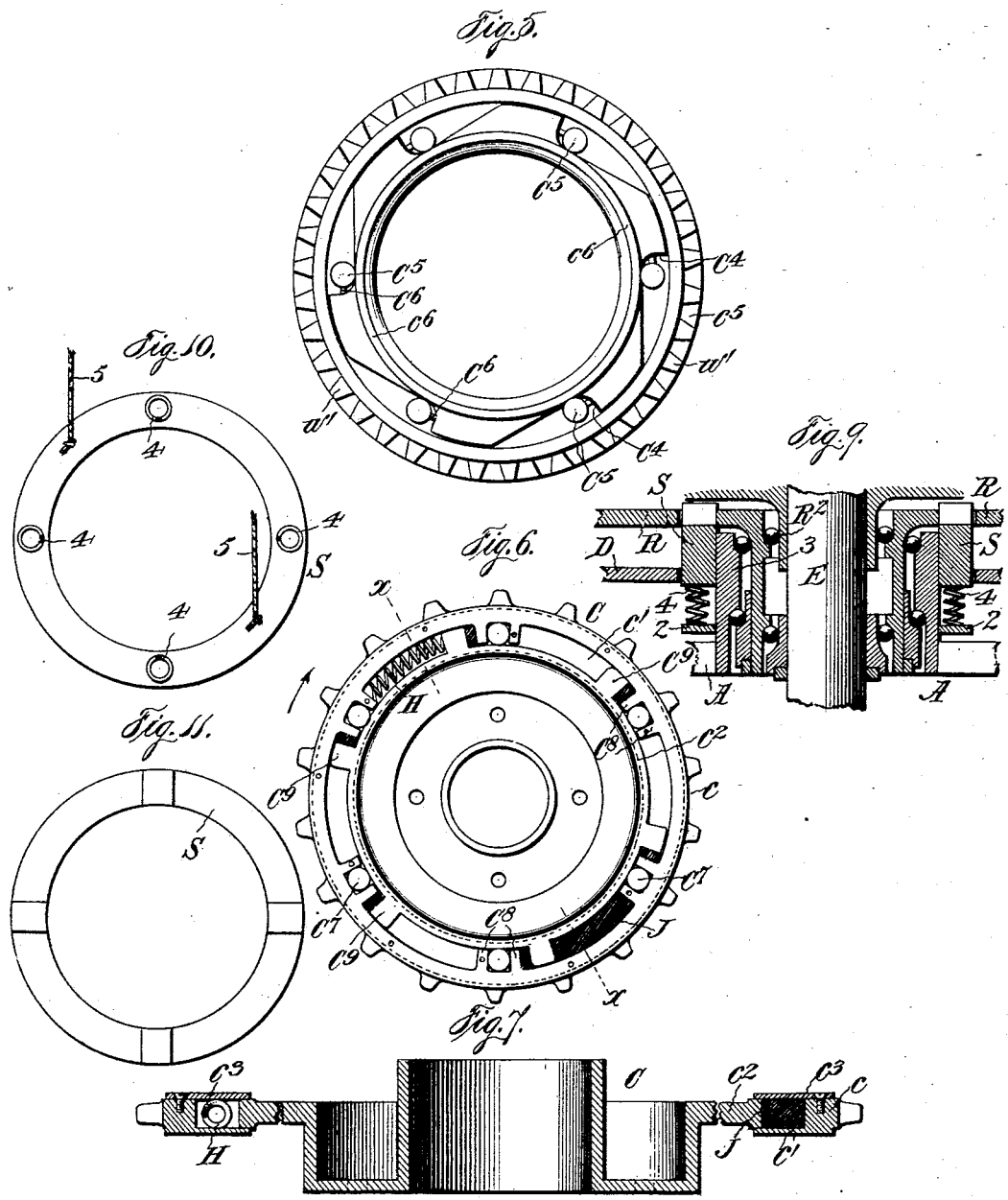
Witnesses:
Inventor.
Donald Macdonald,
By
Attys.

UNITED STATES PATENT OFFICE.

DONALD MACDONALD, OF ORROROO, SOUTH AUSTRALIA, AUSTRALIA.

DRIVING-GEAR FOR MOTOR-CYCLES.

SPECIFICATION forming part of Letters Patent No. 713,467, dated November 11, 1902.

Application filed June 28, 1902. Serial No. 113,662. (No model.)

*To all whom it may concern:*

Be it known that I, DONALD MACDONALD, a subject of the King of Great Britain, residing at Orroroo, in the State of South Australia, in the Commonwealth of Australia, have invented certain new and useful Improvements in Driving-Gear for Motor-Cycles; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has relation to automobile vehicles, and more particularly to automobile or so-called "autocycles;" and it has for its essential objects, first, to provide a motor-operated driving mechanism and a pedal-operated driving mechanism not in driving relation with said motor-operated driving mechanism in combination with a transmitter common to both driving mechanisms, said transmitter in driving relation with the driven axle of the cycle; second, the provision of differential pedal-operated mechanisms and means connecting one or the other of said mechanisms to the pedal-operated element in combination with motor-operated driving mechanism or differential driving mechanisms and means for connecting said mechanism or mechanisms to or disconnecting same from the motor; third, in making the pedal-shaft the carrier for the motor-operated and pedal-operated driving mechanisms and providing a transmitter in the form of a cylindrical casing, also carried by the pedal-shaft and containing said driving mechanisms. These objects I attain by means of mechanisms and combinations of mechanisms, substantially as shown in the accompanying drawings, forming a part of this specification, and as hereinafter fully described, and specifically set forth in the claims.

Referring to the drawings, Figures 1, 2, and 3 are side elevations illustrating various arrangements of the driving appliances. Fig. 4 is a cross-section of said appliances, means for actuating the clutch S being omitted and shown in separate views. Fig. 5 is an outer face view of the sleeve to which the auto-driven cycle-driving wheel is secured. Fig. 6 is a face view of said wheel, the confining-ring being removed. Fig. 7 is a section of said wheel on line $x$ $x$ of Fig. 6, and Fig. 8 is a cross-section on line $y$ $y$ of Fig. 4. Fig. 9 is a fragmentary sectional detail view of the clutch S and its arrangement relatively to the crown-wheel R, and Figs. 10 and 11 are opposite face views of the clutch-ring.

In said Figs. 1, 2, and 3, A indicates the framework of the cycle, which, as shown in Figs. 2 and 3, may be of usual construction, or it may be constructed, as shown in Fig. 1, with the rider's seat immediately above the rear or driving wheel W and with means, as at $a'$, Fig. 1, for receiving or supporting an electric battery or an oil-tank, according to the character of the motor B used, which may be of any desired well-known construction, B' indicating the driving-wheel, which may be a belt or sprocket wheel, according as it is to be geared to the driven cycle-driving wheel C by belt or chain $B^2$, and in the drawings I have shown these wheels as sprocket-wheels.

A casing D, which performs the function of a power-transmitting wheel for transmitting the power of the auto-driven and pedal-driving mechanisms to the machine, may also perform the function of wheel-hub for the rear or driving wheel W of the machine, as shown in Figs. 1 and 3, its axial spindle E then becoming the wheel-spindle, or said casing D, hereinafter referred to as the "transmitter," may be arranged on the center bracket A', with its spindle E revoluble in suitable bearings, as shown in Fig. 2, in which case the lower frame-bars $A^2$ $A^3$ are bifurcated to provide the required space.

For propelling the machine by foot-power the pedals P may be secured to the spindle E of the transmitter D, as shown in Figs. 1 and 2, or they may be secured to a spindle S, mounted in the center bracket A' and geared to said spindle E by chain-and-sprocket gearing E' $E^2$ $e$, as shown in Fig. 3.

Referring now to Figs. 4 to 8, C indicates the auto-driven-cycle driving-wheel, made, as shown in Figs. 6 and 7, in two parts—namely, a sprocket-ring $c$, having an inwardly-projecting annular flange $c'$ and internal radial ball-bearings $C^8$ for balls $C^7$, and a wheel $c^2$, on which the sprocket-ring $c$ is mounted, and provided with peripheral lugs $C^9$, that project into spaces formed between the ball-bearings $C^8$, and in some or all of said spaces between the lugs $C^9$ and ball-bearings $C^8$, in advance of the latter, are arranged spring-buffers H or rubber buffers J. The flange $c'$ on one side of sprocket-ring $c$ overlaps the rim of the wheel $c^2$ to hold it against lateral displacement, and to the opposite side of said sprocket-ring $c$ or to the internal wheel $c^2$ is secured a confining-ring $c^3$, as shown in Fig. 6.

It will be readily seen that on starting the motor the rotation of the sprocket-ring $c$ will be antagonized by the buffers H or J, thus gradually starting the rotation of the wheel until compresssion ceases, when the internal wheel will rotate with sprocket-ring $c$ and transmit the power to the driving-gear.

The wheel C is rigidly secured to a sleeve $C'$, mounted to revolve on ball-bearings about the sleeve $F'$ of a crown-wheel F, said sleeve $F'$ being rigidly secured in any desired manner to the cycle-frame, and E is the axial spindle revolving on ball-bearings in sleeve $F'$ and in suitable frame-bearings $b'$. Said wheel C has the form of a double crank in cross-section, as shown in Figs. 4 and 7, and has two or more apertures in the crank portion thereof for the passage therethrough of coupling studs or pins $s^2$, projecting from an inner flange $s'$ of a coupling-sleeve $s$, loosely mounted on driving-wheel sleeve $C'$. The sleeve $s$ has also an outer flange $s^3$, which is straddled by the flanges of an actuating-ring $r$, U-shaped in cross-section, which is slidable longitudinally of the sleeve $C'$ in a casing or dust-cap $d$, screwed or otherwise secured to crown-wheel sleeve $F'$. Springs $s^4$ in cap $d$ have bearing on the actuating-ring $r$, and under the stress of said springs the coupling studs or pins $s^2$ are coupled to wheel C and to a large gear-wheel $w$, loose on sleeve $C'$, which, like wheel C, has apertures for the passage of said studs.

To the actuating-ring $r$ are secured at different points cords or wires $e$, passing through holes of the dust-cap $d$ and being connected into a single cord or wire outside of said cap and carried over pulleys on the cycle-frame and may be or are secured to a hand-lever fulcrumed on said frame at a point in reach of the rider, so that on pulling said cord or wire the actuating-ring is moved outwardly, and therewith the coupling-sleeve $s$, to withdraw the studs $s^2$ from gear $w$, means being provided to lock the lever so that the springs $s^4$ cannot move the coupling-sleeve $s$ into coupling position. Any other suitable means may, however, be provided for operating this coupling device.

The sleeve $C'$ has an inner flange $c^5$ and a hub or enlarged portion $c^6$, Fig. 5, having notches $C^4$, with inclined faces and abrupt shoulders cut in its periphery for the reception of rollers $C^5$, having bearing on spring-pins $C^6$, which form an elastic abutment for said rollers at the abrupt shoulder of the notches. On this notched hub is mounted an annular gear or externally-toothed ring $w'$, the notched hub and rollers serving as a means to couple the gear $w'$ to sleeve $C'$ when said sleeve is driving and to allow said gear $w'$ to rotate freely when the cycle is driven at high speed, as hereinafter explained. The gear $w'$ is held in place on notched hub $c^6$ by flange $c^5$ on said sleeve $C'$ and by the large gear $w$, hereinbefore described, and loose on sleeve $C'$, and said loose gear $w$ is held in place by the cranked portion of driving-wheel C, as shown in Fig. 4. The large gear $w$ meshes with small planet-wheels $G^\times$, and the gear $w'$ with larger planet-wheels G, whose spindles $G'$ are secured in the end of the transmitter D, while the planet-wheels G gear with an internal gear $F^2$ of crown-wheel F, said crown-wheel having a second internal gear $F^3$ for purposes presently explained.

It is obvious that when the driving-wheel C is rotated to drive and gear $w$ is uncoupled from said wheel by the retraction of coupling-sleeve $s$ said gear $w$ will revolve idly, while the ring-gear $w'$ will be locked to sleeve $C'$ by the rollers wedging in the small ends of the notches $C^4$, thereby driving the larger planet-wheels G, and as these are mounted on the transmitter D and gear with the fixed crown-wheel F the said transmitter will be rotated at a low speed. If, then, the large gear $w$ is coupled to the driving-wheel C, said gear will drive the small planet-wheels $G^\times$, whereby the ring-gear $w'$ will be rotated faster than the sleeve $C'$, causing the clutch-rollers to roll down the inclined faces of the notches $C^4$, and thereby uncouple said gear $w'$ from its sleeve $c'$, allowing it to revolve idly, and as planet-wheels G are now in gear with crown-wheel F the casing D will be rotated at the higher speed, the described gearing thus performing the function of reducing any differential gearing.

If the cycle is to be driven by foot-power only, the motor is or may be stopped, and if at the time the gear $w$ is coupled to the drive-wheel C it is uncoupled therefrom, causing the auto-driven driving-gear to run idle.

In order that the machine may be propelled by foot-power the transmitter D is provided with additional internal epicyclic gearing, whereby motion may be imparted to it from the internal spindle E. Furthermore, internal epicyclic gearing within the transmitter D may be arranged, as shown in Fig. 4, for the purpose of providing a differential gear. Upon the spindle E are secured two planet-carriers K and L, each carrying planet-wheels, those M on carrier K being of smaller diameter than the planet-wheels N on carrier L, said wheels M and N being mounted on spindles $M'$ and $N'$, respectively, and said planet-wheels M are in gear with the internal gear-teeth $F^3$ of the crown-wheel F, hereinbefore referred to. The planet-wheels M are also in gear with an annular gear or ring loose on a sleeve P, which revolves on ball-bearings about spindle E and is connected to or formed integral with the transmitter D by means of a central web or flange P². Thus as the planet-wheels M are rotated by the planet-carrier K motion is imparted to the sleeve P and transmitter D, since the crown-wheel F is stationary, being fixed to the framework A. The planet-wheels N, carried by the planet-carrier L, are in gear with the inner peripheral teeth R' of a second crown-wheel R, loosely mounted on ball-bearings R², working on the spindle E, a clutch S being provided and adapted to engage the recesses R³ in the web of said crown-wheel R, which may thus be locked to the machine-frame A against rotation at any time by actuating the clutch S to engage the recesses R³.

Any suitable means connected to or operated by a hand-lever in reach of the driver may be used for operating the clutch. For instance, means, substantially such as shown and described in reference to the clutch-ring S, may be employed, a suitable abutment-disk 2 being secured to fixed sleeve 3, to which the lower frame-bars A are connected, against which abutment bear springs 4, acting on the clutch-ring to move it toward the crown-wheel R, and to the outer face of the clutch-ring S wires 5 may be secured and united into a single wire, connected with a lever in reach of the driver, suitable means being provided to lock the lever and hold the clutch-ring against motion under the stress of its springs. I do not desire, however, to limit myself to the construction shown and described, as any other suitable or desired means may be adopted, such means being altogether within the province of the skilled mechanic. With the crown-wheel R held stationary by the clutch S, the planet-wheels N actuate the teeth P³ on the sleeve P, which in its turn imparts motion to the casing D by means of the central flange P².

In order that the planet-wheels M may move idly when the planet-wheels N are in gear, the gear P' is an annular or ring gear similar to gear $w'$ and is provided with an internal coupling mechanism similar to that described in respect of the driving-sleeve C' and said gear $w'$, with the exception that the direction of inclination of the inclined faces of the notches C⁴ are reversed, said notches being formed in a boss $p^4$ on sleeve P, as shown in Fig. 8, C¹⁴ indicating the notches, P⁵ the rollers, and C¹⁶ their spring abutment-pins. Thus when the crown-wheel R is engaged by the clutch S the planet-wheels N drive the sleeve P and transmitter D through said sleeve P and central flange P², while the greater speed of said sleeve causes the rollers P⁵ of the coupling mechanism which couples the annular gear P' to planet-gears M to move down the inclined faces of the notches, thereby uncoupling sleeve P from said planet-wheels M, which then revolve idly. The coupling appliances for coupling gear $w$ with drive-wheel C and the clutch-coupling S, which couples the sleeve P with the gear P', not only serve as a means for driving the transmitter D either by auto or by foot power at different speeds, but also admit of the motor being started automatically by rolling the cycle by hand or driving it by foot-power at the lower speed through the planet-gears M, thereby revolving transmitter D, and therethrough the planet-wheels G Gˣ, and if large gear $w$, which gears with planet-wheel Gˣ, is coupled to drive-wheel C the latter will also be rotated, and therethrough the driving-wheel C, and through the latter the motor-wheel B', as will be readily understood. These coupling devices also admit of the free rotation of transmitter D in cycling downhill as it is obvious that when the clutch S is disengaged from the crown-wheel R and the coupling-sleeve $s$ from gear $w$ both auto and pedal driven mechanisms are neutralized, said transmitter D being then free to revolve, the gearing working idle, so that the motor need not necessarily be stopped while the spindle E is held stationary by the rider's feet. I also provide an internal brake mechanism working in combination with the above-described gear and adapted to be operated by back-pedaling. For this purpose the planet-carrier K is provided with one or more ratchet-teeth K' upon its periphery, as shown in Figs. 4 and 8. These teeth K' engage arms T, jointed at T' and projecting through a slot in a periphery of the crown-wheel F, which is constructed of suitable shape for the purpose. These arms T carry brake-blocks T², which engage the inside of the casing D. Thus as pressure is applied in a backward direction by means of back-pedaling the arms T are forced outward by the teeth K' and the brake-blocks T² are caused to engage the casing D.

Having thus described my invention, what I claim as new therein, and desire to secure by Letters Patent, is—

1. The combination with an autocycle, its motor and the driving mechanism; of supplementary pedal-operated differential driving mechanisms and means connecting one or the other of said mechanisms to the pedal-operated element, for the purpose set forth.

2. The combination with an autocycle, its motor, differential driving mechanisms operated thereby and means connecting one or the other of said mechanisms to the motor; of supplementary pedal-operated differential driving mechanisms, and means connecting one or the other of the last-named mechanisms to the pedal-operated element, for the purpose set forth.

3. The combination with an autocycle, its motor and driving mechanism operated thereby; of supplementary pedal-operated differential driving mechanisms, means connecting one or the other of the last-named mechanisms to the pedal-operated element and means neutralizing the motor-operated mechanism, for the purpose set forth.

4. The combination with an autocycle, its motor, differential driving mechanisms operated thereby and means connecting one or the other of said mechanisms to the motor; of supplementary pedal-operated differential driving mechanisms, means connecting one or the other of said mechanisms to the pedal-operated element, and means neutralizing the motor-operated driving mechanisms, for the purpose set forth.

5. The combination with an autocycle, its driven axle, its motor, driving mechanism operated thereby and pedal-operated driving mechanism not in driving connection with the motor-operated driving mechanism; of a power-transmitter common to both driving mechanisms and a driving connection connecting the transmitter to the aforesaid driven axle, for the purpose set forth.

6. The combination with an autocycle, its driven axle, its motor, driving mechanism operated thereby, separate pedal-operated differential driving mechanisms and means connecting one or the other of said mechanisms to the pedal-operated element; of a power-transmitter common to the motor and pedal operated driving mechanisms and a driving connection connecting the transmitter to the aforesaid driven axle, for the purpose set forth.

7. The combination with an autocycle, its driven axle, its motor, differential driving mechanisms operated thereby, means connecting one or the other of said mechanisms to the motor, supplementary pedal-operated differential driving mechanisms and means connecting one or the other of said mechanisms to the pedal-operated element; of a power-transmitter common to the motor and pedal operated differential driving mechanisms, and a driving connection connecting the transmitter to the aforesaid driven axle, for the purposes set forth.

8. The combination with an autocycle, its driven axle, its motor, a driving-wheel driven by said motor, driving mechanism and means for connecting the latter to and disconnecting it from said driving-wheel, separate pedal-operated driving mechanism and means for connecting the same to and disconnecting it from the pedal-operated element; of a power-transmitter common to the motor and pedal operated driving mechanisms, and a driving connection connecting the transmitter to the aforesaid driven shaft, for the purposes set forth.

9. The combination with an autocycle, its driven axle, its motor, a driving-wheel driven thereby, differential driving mechanisms, means for connecting one or the other of said mechanisms to the driving-wheel, separate pedal-operated driving mechanism and means for connecting it to and disconnecting it from the pedal-operated element; of a power-transmitter common to the motor and pedal operated driving mechanisms, and a driving connection connecting the transmitter to the aforesaid driven axle, for the purpose set forth.

10. The combination with an autocycle, its driven axle, its motor, a driving-wheel driven thereby, differential driving mechanisms, means connecting one or the other of said mechanisms to said driving-wheel, pedal-operated differential driving mechanisms and means connecting one or the other of the last-named mechanisms to the pedal-operated element; of a power-transmitter common to the motor and pedal operated differential driving mechanisms, and a driving connection connecting the transmitter to the aforesaid driven axle, for the purpose set forth.

11. The combination with an autocycle, its driven axle, its motor, driving mechanism, a driving connection connecting the same to the motor, and separate pedal-operated driving mechanism; of a power-transmitter in the form of a cylindrical casing containing said driving mechanisms, means connecting one or the other of said mechanisms to the transmitter, and a driving connection connecting the transmitter to the aforesaid driven axle, for the purpose set forth.

12. The combination with an autocycle, its driven axle, its motor, differential driving mechanisms, means connecting one or the other of said mechanisms to the motor, and separate pedal-operated driving mechanism; of a power-transmitter in the form of a casing containing said driving mechanisms, means connecting either of the differential motor-operated driving mechanisms or the pedal-operated mechanism to the transmitter, and a driving connection connecting the transmitter to the aforesaid driven axle, for the purpose set forth.

13. The combination with an autocycle, its driven axle, its motor, driving mechanism, means for connecting the same to and disconnecting it from the motor, pedal-operated differential driving mechanisms, and means connecting one or the other of the last-named mechanisms to the pedal-operated element; of a power-transmitter in the form of a cylindrical casing, containing the aforesaid driving mechanisms, means connecting either the motor-operated driving mechanism or one or the other pedal-operated driving mechanism to the transmitter, and a driving connection connecting the transmitter to the aforesaid driven axle, for the purpose set forth.

14. The combination with an autocycle, its driven axle, its motor, differential driving mechanisms, means connecting one or the other of said mechanisms to the motor, differential pedal-operated driving mechanisms, and means connecting one or the other of the last-named mechanisms to the pedal-operated element; of a power-transmitter in the form of a cylindrical casing containing said motor and pedal operated differential driving mechanisms, means connecting one or the other motor-operated differential driving mechanism, or one or the other pedal-operated differential driving mechanism to the transmitter, and a driving connection connecting the transmitter to the aforesaid driven axle, for the purpose set forth.

15. The combination with an autocycle, its driven axle, its motor, pedal-shaft, driving mechanism and means for connecting the same to and disconnecting it from the motor, separate driving mechanism, and means for connecting it to and disconnecting it from the pedal-shaft; of a power-transmitter, means connecting the motor-operated or pedal-operated driving mechanisms to the transmitter, and a driving connection connecting said transmitter to the aforesaid driven axle, for the purpose set forth.

16. The combination with an autocycle, its driven axle, motor, pedal-shaft, differential driving mechanisms, means for connecting one or the other of said mechanisms to the motor, separate driving mechanism and means for connecting the same to and disconnecting it from the pedal-shaft; of a power-transmitter, means connecting one or the other motor-operated differential driving mechanism or the pedal-operated driving mechanism to said transmitter, and a driving connection connecting the transmitter to the aforesaid driven axle, for the purpose set forth.

17. The combination with an autocycle, its driven axle, motor, pedal-shaft, differential driving mechanisms, means connecting one or the other of said mechanisms to the motor, separate differential driving mechanisms, and means connecting one or the other of the last-named mechanisms to the pedal-shaft; of a power-transmitter, means connecting one or the other motor-operated or one or the other pedal-operated differential driving mechanisms to said transmitter, and a driving connection connecting the transmitter to the aforesaid driven axle, for the purpose set forth.

18. The combination with an autocycle, its driven axle, motor and pedal-shaft; of driving mechanism, means for connecting the same to and disconnecting it from the motor, separate driving mechanism, means connecting same to and disconnecting it from the pedal-shaft, a power-transmitter, means connecting the motor or the pedal operated driving mechanism to said transmitter, the latter and aforesaid mechanisms carried by said pedal-shaft, and a driving connection connecting the transmitter to the aforesaid driven axle, for the purpose set forth.

19. The combination with an autocycle, its driven axle, motor, and pedal-shaft; of differential driving mechanisms, means connecting one or the other to the motor, separate driving mechanism, means for connecting it to and disconnecting it from the pedal-shaft, a power-transmitter, means connecting one or the other motor-operated differential driving mechanism or the pedal-operated driving mechanism to said transmitter, the latter and aforementioned driving mechanisms carried by the pedal-shaft, and a driving connection connecting the transmitter to the aforesaid driven axle, for the purpose set forth.

20. The combination with an autocycle, its driving-axle, motor, and pedal-shaft; of differential driving mechanisms, means connecting one or the other of said mechanisms to the motor, separate differential driving mechanisms, means connecting one or the other of the last-named mechanisms to the pedal-shaft, a power-transmitter, means connecting one or the other motor-operated or one or the other pedal-operated driving mechanisms to the transmitter, the latter and aforementioned differential driving mechanisms carried by said pedal-shaft, and a driving connection connecting the transmitter to the aforesaid driven axle, for the purpose set forth.

In testimony that I claim the foregoing as my invention I have signed my name in presence of two subscribing witnesses.

DONALD MACDONALD.

Witnesses:
HENRY ORTH,
PHILIP F. LARNER.